2,826,568

United States Patent Office
Patented Mar. 11, 1958

2,826,568
TRIFLUOROCHLOROETHYLENE COPOLYMERS WITH 4,6,7-TRICHLOROPERFLUOROHEPTENE-1

William S. Barnhart, Cranford, and Robert H. Wade, West Paterson, N. J., assignors, by mesne assignments, to Minnesota Mining and Manufacturing Company, St. Paul, Minn., a corporation of Delaware No Drawing. Application January 13, 1956
Serial No. 558,846

10 Claims. (Cl. 260—87.5)

This invention relates to halogen-containing copolymers, and more particularly to copolymers obtained from trifluorochloroethylene. The invention has as an object, new and useful compositions of matter. Another object of the invention is valuable copolymeric compositions comprising trifluorochloroethylene. A still further object of the invention, resides in a process for obtaining these copolymeric compositions in good yields. Other objects and advantages inherent in the invention will become apparent to those skilled in the art from the accompanying description and disclosure.

In accordance with the present invention, elastomeric copolymers are produced by copolymerizing trifluorochloroethylene with 4,6,7-trichloroperfluoroheptene-1 under the conditions as more fully hereinafter described. The copolymers thus obtained are valuable macromolecules and are adaptable to a wide variety of commercial uses, having chemical and physical characteristics comparable to natural-rubber gum stocks and solvent-swell characteristics comparable to fluorine-containing rubbers. These copolymers possess low-temperature flexibility, elasticity and resiliency, and are easily vulcanized and processed. They are chemically and thermally stable, resistant to oil and hydrocarbon-fuels, selectively soluble in various commercial solvents and can be molded by conventional techniques to yield a wide variety of useful articles. They are also useful as durable, flexible, protective coatings on surfaces which are subjected to environmental conditions in which they may come into contact with various corrosive substances such as oils, fuels and strong chemical reagents.

The preparation of the trifluorochloroethylene monomer, is now well-known to those skilled in the art of fluorocarbon chemistry, and requires no further elaboration. The 4,6,7-trichloroperfluoroheptene-1 monomer, viz., $Cl(CF_2CFCl)_2CF_2CF=CF_2$, is prepared from the pyrolysis of the sodium salt, $Cl(CF_2CFCl)_3CF_2COONa$. The preparation of this sodium salt is described in detail in our prior and co-pending application Serial No. 501,782, filed April 18, 1955. In carrying out the pyrolysis, the dried sodium salt is pyrolyzed in a round-bottom flask equipped with a Claisen-head to which a condenser is attached. The product is collected in a two-necked flask. Most of the product distills between a pot-temperature of 200–270° C. During the last portion of the pyrolysis, a vacuum is applied to the receiver. The crude $C_7$ olefin is washed with ferrous sulfate and sodium bicarbonate and finally dried over sodium sulfate. The dried product is then distilled through a 600 ml. x 19 mm. vacuum-jacket McMahon packed-column. The preparation of the monomer 4,6,7-trichloroperfluoroheptene-1 is described in considerably more detail in our prior and co-pending application Serial No. 517,926, filed June 24, 1955.

The most useful elastomeric copolymers produced in accordance with this invention contain between about 5 mole percent and about 95 mole percent trifluorochloroethylene, and the remaining major monomeric constituent being 4,6,7-trichloroperfluoroheptene-1. The preferred copolymers contain between about 50 mole percent and about 95 mole percent trifluorochloroethylene and the remaining major constituent being the 4,6,7-trichloroperfluoroheptene-1.

The elastomeric copolymers of the present invention are preferably prepared by employing a water-soluble peroxy-type initiator in a water-emulsion type recipe or an organic peroxide initiator in a bulk-type system. The water-emusion type recipe is preferred.

The water-emulsion type recipe system contains, in addition to an emulsifying agent, the water-soluble peroxy-type initiator which is preferably present in the form of an inorganic persulfate, such as potassium persulfate, sodium persulfate, ammonium persulfate, or may contain cumene hydroperoxide in a redox-activated system. In addition, the water-emulsion type recipe system may also contain, in some instances, a variable-valence metal salt, for example, an iron salt, such as ferrous sulfate or ferrous nitrate, which is employed for the purpose of inducing the decomposition of the initiator. Furthermore, these water-emulsion type recipe systems may also contain sequestering or complexing agents, such as sodium pyrophosphate, and a reducing sugar, such as dextrose. The water-soluble initiator, present in the water-emulsion type recipe system comprises between about 0.1 and about 5 parts by weight per 100 parts of total monomers present. The variable-valence metal salt is preferably employed in an amount between 0.01 and about 0.2 part by weight per 100 parts of total monomers present. It is also preferred, in these water-emulsion type recipe systems, that a reductant be present, which is preferably in the form of a bisulfite, such as potassium bisulfite, sodium bisulfite, potassium metabisulfite or sodium metabisulfite. The reductant, for example, sodium metabisulfite, comprises between about 0.05 and about 5 parts by weight per 100 parts of total monomers present; and preferably comprises between about 0.1 and about 2 parts by weight per 100 parts of total monomers present. It has also been found that the presence of such materials as borax, along with the initiator and the reductant is beneficial in these water-emulsion type recipe systems in aiding in the maintenance of optimum pH conditions.

The emulsifying agent employed in the above-mentioned water-emulsion type recipe systems is present either in the form of a metallic salt or an aliphatic acid having from 14 to 20 carbon atoms per molecule, or in the form of a halogenated organic acid or the metallic salt of a halogenated organic acid having from 6 to 18 carbon atoms per molecule. A typical example of the former is the commercial mixture of the potassium salts of oleic, palmitic and stearic acids (KORR soap—Potassium Rubber Reserve Quality Soap—Procter & Gamble Co.). Typical examples of the halogenated organic acids or salts thereof serving as emulsifying agents in the above-mentioned recipes, are polyfluorocarboxylic acids (e. g., perfluorooctanoic acid) or perfluorochlorocarboxylic acid salts (e. g., trifluorochloroethylene telomer acid soaps). The perfluorocarboxylic acids which may be employed are such as those disclosed in U. S. Patent No. 2,559,752; and the non-acidic derivatives of the acids disclosed therein as being effective dispersing agents in polymerization reactions may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents comprise between about 0.5 and about 10 parts by weight per 100 parts of total monomers present.

The emulsion polymerization is preferably conducted under alkaline conditions. It is desirable, in these emulsion polymerization systems that the pH be maintained between about 7 and 11 in order to prevent gelling of the resulting latex, a condition which often causes slow-down or stoppage of the polymerization reaction. In this respect, it should be noted that it is sometimes necessary to maintain the pH of the system within the aforementioned pH limits by the addition of suitable buffer agents.

As indicated above, the polymerization reaction may also be carried out with the catalyst being present in the form of an organic peroxide promoter in a bulk-type polymerization system. Of these organic peroxide promoters halogen-substituted acetyl peroxides are preferably employed. A preferred promoter of this type is trichloroacetyl peroxide. Other halogen-substituted organic peroxides which are suitable for carrying out the polymerization reaction are trifluorodichloropropionyl peroxide, trifluoroacetyl peroxide, difluoroacetyl peroxide, chloroacetyl peroxide, 2,4-dichlorobenzoyl peroxide and dichlorofluoroacetyl peroxide. The copolymerization reactions described therein to produce the copolymers of the present invention are carried out under autogenous conditions of pressure. In general, these pressures do not rise above approximately 200 pounds per square inch. The copolymerization reaction is carried out, in general, at a temperature between about −20° C. and about 150° C. Within this range, temperatures between about 0° C. and about 50° C. are preferably employed.

As previously indicated, the elastomeric copolymers of the present invention are particularly suitable and useful for the fabrication of a wide variety of rubber-like materials having highly desirable physical and chemical properties. In this respect, the copolymers of the present invention possess important utility in the manufacture of protective articles of clothing, such as boots, suits, gloves and in the fabrication of resilient gaskets, seals, pump and valve diaphragms, films and various other commercial applications.

Another important use of the copolymers of the present invention is in the form of durable, flexible coatings on surfaces which are subjected to distortion in normal usage, such as fabric surfaces. For this purpose, the copolymers of the present invention may be dissolved in various commercial solvents. Particularly useful solvents comprise the aliphatic and aromatic esters, ketones and halogenated hydrocarbons. Typical examples of these solvents are methyl ethyl ketone, methyl isobutyl ketone, di-isobutyl ketone, ethyl acetate and 1,1,2-trifluorotrichloro-ethane. In this respect, it should be noted that it is often desirable to regulate the molecular weight of the copolymers of the present invention in order to obtain greater solubility in organic solvents. It is also of importance to vary the softness of the copolymer for easier processibility in molding operations. It is found that the addition of various polymerization modifiers appreciably reduces the molecular weight of the copolymers and increases their slubility and ease of processibility without affecting unduly the yield of copolymers. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloroethane ($CBrCl_3$), dodecyl mercaptan ($C_{12}H_{25}SH$) and mixed tertiary mercaptans. These modifiers are preferably added in amounts of about 0.01 and about 10 parts by weight per 100 parts of total monomers charged to the polymerization reaction. Dodecyl mercaptan is preferred.

The following examples are offered for a better understanding of the present invention in producing copolymers of trifluorochloroethylene and 4,6,7-trichloroperfluoroheptene-1 and are not to be construed as limiting its scope.

*Example I*

A heavy-walled glass polymerization tube was flushed with nitrogen and then charged with 1 ml. of a solution containing 0.5 gram of sodium metabisulfite and 0.5 gram of borax in 20 ml. of water. The contents of the tube were then frozen and the tube was next charged with 6 ml. of a soap solution of the ammonium salt of perfluorooctanoic acid ($C_7F_{15}COONH_4$) and 0.1 gram of dodecyl mercaptan dissolved in 100 cc. of water. The pH of the soap solution was first adjusted with a 5% solution of potassium hydroxide to 10. The contents of the tube were next frozen in a Dry-Ice-acetone bath and the tube was then charged with 4 ml. of an initiator solution comprising 1.0 gram of potassium persulfate dissolved in 80 ml. of water. The tube was next connected to a vacuum-transfer system and evacuated at liquid nitrogen temperature. To the frozen contents of the tube were added, by distillation, 4.75 grams of trifluorochloroethylene and 0.25 gram of 4,6,7-trichloroperfluoroheptene-1 to make up a total monomer charge containing 98.5 mole percent of trifluorochloroethylene and 1.5 mole percent of 4,6,7-trichloroperfluoroheptene-1.

The polymerization tube was then sealed and rotated end-over-end in a temperature-regulated water-bath at 50° C. for a period of 24 hours. At the end of this time, the contents of the tube were coagulated by freezing at liquid nitrogen temperatures. The coagulated product was then collected, washed with hot water and dried to constant weight in vacuo at 35° C. A copolymeric product was obtained which was found, upon analysis, to comprise approximately 90.5 mole percent trifluorochloroethylene and 9.5 mole percent 4,6,7-trichloroperfluoroheptene-1. The copolymer was obtained in an amount corresponding to an 88% conversion.

*Example II*

Employing the procedure set forth in Example I and the same polymerization recipe, the polymerization tube was charged with 4.5 grams of trifluorochloroethylene and 0.5 gram of 4,6,7-trichloroperfluoroheptene-1 to make-up a total monomer charge containing 96.9 mole percent of trifluorochloroethylene and 3.1 mole percent 4,6,7-trichloroperfluoroheptene-1.

The polymerization reaction was carried out at a temperature of approximately 50° C. for a period of 24 hours. The resulting polymerization product was worked-up in accordance with the same procedure as set forth in Example I. A copolymeric product was obtained and was found, upon analysis, to comprise approximately 88.5 mole percent trifluorochloroethylene and 11.5 mole percent 4,6,7-trichloroperfluoroheptene-1. The above copolymer was obtained in an amount corresponding to an 84% conversion.

*Example III*

Employing the procedure set forth in Example I above, and the same polymerization recipe, the polymerization tube was charged with 4 grams of trifluorochloroethylene and 1 gram of 4,6,7-trichloroperfluoroheptene-1 to make-up a total monomer charge containing 93 mole percent trifluorochloroethylene and 7 mole percent 4,6,7-trichloroperfluoroheptene-1.

The polymerization reaction was carried out at a temperature of approximately 50° C. for a period of 24 hours. The resulting polymerization product was worked-up in accordance with the same procedure as set forth in Example I. The copolymeric product obtained was found to comprise approximately 91.5 mole percent trifluorochloroethylene and about 8.5 mole percent 4,6,7-trichloroperfluoroheptene-1. The above copolymer was obtained in an amount corresponding to a 68% conversion.

As previously indicated, the elastomeric copolymers of the present invention possess highly desirable chemical and physical properties which make them useful for the fabrication of a wide variety of rubber-like articles or for application to various surfaces as protective coatings. In such uses, the raw elastomeric copolymer, (such as is produced in accordance with the procedure set forth in Examples I, II and III above) can be extruded or pressed into sheets at temperatures between about 200° F. and about 650° F. and at a pressure between about 500 and about 1500 pounds per square inch for a period of about 1 minute to about 10 minutes. Thereafter, various articles can be molded from preforms cut from sheets or extruded stock in the form of gaskets, diaphragms, etc. In this respect, it should be noted that the raw copolymer may be combined with various vulcanizing agents and fillers, if desired.

When employed as protective coatings on any of the surfaces previously described, the raw elastomeric copolymer is dissolved in any of the aforementioned solvents, and is applied to the desired surfaces, employing such apparatus as a knife-spreader or a doctor-blade or a reverse-roll coater. The solvent, after the elastomeric coating composition has been applied to the surface, is permitted to evaporate. This may also be accomplished in the presence of elevated temperatures. In many applications, it is desirable to include in the elastomeric coating composition, various vulcanizing agents, in which case supplementary heat treatment of the coating is required either during the solvent removal step or thereafter. After the solvent has been completely evaporated and after the vulcanization step, if included, has been completed, the coated surface is ready for use. It should also be noted that the copolymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings or the elastomeric copolymer when obtained in the form of sheets, may be suitably pigmented. Other uses for the copolymers of the present invention reside in the fabrication of pressure-sensitive tape for electrical insulation purposes or as adhesives for fastening a rubber surface to a metal or another rubber surface.

Since certain changes may be made in carrying out the process of the present invention in producing the desired elastomeric copolymers without departing from the scope of the invention, it is intended that all matter contained in the above description is to be interpreted as illustrative and not in a limiting sense.

We claim:

1. A process for preparing a copolymer which comprises copolymerizing trifluorochloroethylene and 4,6,7-trichloroperfluoroheptene-1 at a temperature between about −20° C. and about 150° C.

2. A process for preparing a copolymer which comprises copolymerizing trifluorochloroethylene and 4,6,7-trichloroperfluoroheptene-1 at a temperature between about 0° C. and about 75° C.

3. A process for preparing a copolymer which comprises copolymerizing a mixture comprising between about 5 mole percent and about 95 mole percent trifluorochloroethylene and correspondingly between about 95 mole percent and about 5 mole percent 4,6,7-trichloroperfluoroheptene-1.

4. A process for preparing a copolymer which comprises copolymerizing a mixture comprising between about 50 mole percent and about 95 mole percent trifluorochloroethylene and correspondingly between about 50 mole percent and about 5 mole percent 4,6,7-trichloroperfluoroheptene-1.

5. A process for preparing a copolymer which comprises copolymerizing a mixture comprising between about 5 mole percent and about 95 mole percent trifluorochloroethylene and correspondingly between about 95 mole percent and about 5 mole percent 4,6,7-trichloroperfluoroheptene-1 at a temperature between about −20° C. and about 150° C.

6. A process for preparing a copolymer which comprises copolymerizing a mixture comprising between about 5 mole percent and about 95 mole percent trifluorochloroethylene and correspondingly between about 95 mole percent and about 5 mole percent 4,6,7-trichloroperfluoroheptene-1 at a temperature between about 0° C. and about 50° C.

7. A process for preparing a copolymer which comprises copolymerizing a mixture comprising between about 50 mole percent and about 95 mole percent trifluorochloroethylene and correspondingly between about 50 mole percent and about 5 mole percent 4,6,7-trichloroperfluoroheptene-1 at a temperature between about −20° C. and about 150° C.

8. A process for preparing a copolymer which comprises copolymerizing a mixture comprising between about 50 mole percent and about 95 mole percent trifluorochloroethylene and correspondingly between about 50 mole percent and about 5 mole percent 4,6,7-trichloroperfluoroheptene-1 at a temperature between about 0° C. and about 50° C.

9. A copolymer comprising between about 5 mole percent and about 95 mole percent trifluorochloroethylene and correspondingly between about 95 mole percent and about 5 mole percent 4,6,7-trichloroperfluoroheptene-1.

10. A copolymer comprising between about 50 mole percent and about 95 mole percent trifluorochloroethylene and correspondingly between about 50 mole percent and about 5 mole percent 4,6,7-trichloroperfluoroheptene-1.

References Cited in the file of this patent

UNITED STATES PATENTS

| | | |
|---|---|---|
| 2,392,378 | Hanford | Jan. 8, 1946 |
| 2,559,752 | Berry | July 10, 1951 |
| 2,668,864 | Hals et al. | Feb. 9, 1954 |